United States Patent
Cheatham et al.

(10) Patent No.: US 9,790,765 B2
(45) Date of Patent: Oct. 17, 2017

(54) NON-PARALLEL MULTI-BORE SEALING DEVICE

(71) Applicant: GE Oil & Gas Pressure Control LP, Houston, TX (US)

(72) Inventors: Lloyd Ray Cheatham, Lake Jackson, TX (US); Ben Calvin Holgate, Houston, TX (US); Travis Kyle McEvoy, Houston, TX (US); Christopher Michael Menard, Houston, TX (US); Christopher Joseph Dibernardo, Houston, TX (US)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 268 days.

(21) Appl. No.: 14/507,298

(22) Filed: Oct. 6, 2014

(65) Prior Publication Data

US 2016/0097251 A1    Apr. 7, 2016

(51) Int. Cl.
| | |
|---|---|
| *E21B 34/02* | (2006.01) |
| *E21B 33/068* | (2006.01) |
| *E21B 33/12* | (2006.01) |
| *F16K 5/02* | (2006.01) |
| *F16K 5/16* | (2006.01) |
| *F16K 11/083* | (2006.01) |

(52) U.S. Cl.
CPC ............ *E21B 34/02* (2013.01); *E21B 33/068* (2013.01); *E21B 33/12* (2013.01); *F16K 5/0214* (2013.01); *F16K 5/0264* (2013.01); *F16K 5/0271* (2013.01); *F16K 5/162* (2013.01); *F16K 11/0833* (2013.01)

(58) Field of Classification Search
CPC ..................................................... F16K 5/0278
See application file for complete search history.

(56) References Cited

U.S. PATENT DOCUMENTS

| | | | |
|---|---|---|---|
| 3,741,248 A | 6/1973 | Stephens, Jr. | |
| 3,771,765 A * | 11/1973 | Scapes | F16K 5/0214 |
| | | | 137/625.47 |

(Continued)

FOREIGN PATENT DOCUMENTS

EP          2039969 A1      3/2009

OTHER PUBLICATIONS

International Search Report and Written Opinion issued in connection with corresponding PCT Application No. PCT/US2015/050318 on Feb. 9, 2016.

*Primary Examiner* — Caroline Butcher
(74) *Attorney, Agent, or Firm* — Hogan Lovells US LLP

(57) ABSTRACT

An apparatus for sealing at least one hub bore of a multi-bore fluid hub associated with a wellhead assembly includes a plug body having a plug bore opening on an outer mating surface. A plug bore extends from a first end of the plug body to the plug bore opening. The plug body is selectively insertable into a hub housing of the multi-bore fluid hub. An insert is in engagement with the outer mating surface and is moveable relative to the plug body between an unengaged position, and an engaged position where the insert seals across one of the hub bores. A stem member is coupled to the plug body and is moveable to selectively rotate the plug body within the multi-bore fluid hub so that the plug bore opening aligns with one of the hub bores and the insert aligns with another of the hub bores.

20 Claims, 4 Drawing Sheets

(56) References Cited

U.S. PATENT DOCUMENTS

| | | |
|---|---|---|
| 6,056,001 A | 5/2000 | Boyles et al. |
| 2005/0006150 A1 | 1/2005 | Sims et al. |
| 2005/0236049 A1 | 10/2005 | Manson et al. |
| 2005/0236050 A1 | 10/2005 | Manson et al. |
| 2006/0027779 A1* | 2/2006 | McGuire ............... F16K 5/0407 251/309 |

* cited by examiner

NON-PARALLEL MULTI-BORE SEALING DEVICE

BACKGROUND OF THE INVENTION

1. Field of the Invention

The present invention relates in general to a multi-bore fluid flow hub for use in hydrocarbon operations, and in particular to an assembly for sealing certain bores of the hub.

2. Brief Description of Related Art

Multi-bore fluid hubs allow a single point of connection to a fluid supply source and multiple points of connection to fluid outlets, and can provide fluid flow control and shut down capabilities. Multi-bore fluid hubs can significantly decrease the number of valves needed to select one of a number of fluid paths, compared to traditional valve configurations required to perform a similar function. Reducing the number of valves decreases maintenance requirements, as well as the footprint and the weight of the required equipment.

In traditional hydraulic fracturing operations using fracturing manifolds, a series of skids are usually included that contain a number of lines and valves that are opened or closed to direct the fluids to the correct well. Certain of these valves will be subject to high pressure fluids in the closed position to block the flow of fluids to a particular well, which has a detrimental effect on the useful life of such valves. The use of a multi-bore fluid hub allows hydraulic fracturing operations to be run in one of the wells in parallel with other operations on the other wells without disconnecting the fracturing equipment.

When one of the hub bores is selected to act as the fluid outlet, unless the other hub bores are sealed, fluids can leak between the components attached to those other hub bores and the multi-bore fluid hub. If no component is attached to one of the other hub bores, fluids can leak between the environment and the multi-bore fluid hub if there is no seal to prevent such leakage.

SUMMARY OF THE DISCLOSURE

Embodiments of the current disclosure provide systems and methods for sealing certain hub bores of a multi-bore fluid flow hub, allowing fluid to flow through a selected hub bore, while preventing fluids from leaking through each of the other hub bores.

In an embodiment of the current application, an apparatus for sealing at least one hub bore of a multi-bore fluid hub associated with a wellhead assembly includes a plug body having a plug bore opening on an outer mating surface of the plug body. A plug bore extends from a first end of the plug body to the plug bore opening. The plug body has a central axis and is selectively insertable into a hub housing of the multi-bore fluid hub. An insert is in engagement with the outer mating surface of the plug body and is moveable relative to the plug body between an unengaged position, and an engaged position where the insert seals across one of the hub bores. A stem member is coupled to the plug body. The stem member is moveable to selectively rotate the plug body within the multi-bore fluid hub so that the plug bore opening aligns with one of the hub bores and the insert aligns with another of the hub bores.

In an alternate embodiment of the current application, an apparatus for sealing hub bores of a multi-bore fluid hub associated with a wellhead assembly includes a hub housing having a sidewall, the hub bores being formed through the sidewall. A plug body has a plug bore extending from a first end of the plug body to a plug bore opening on an outer mating surface of the plug body. The plug body has a central axis and is selectively insertable into the hub housing. The plug body is rotatable in the housing so that the plug bore opening aligns with one of the hub bores. A plurality of inserts are spaced around the outer mating surface of the plug body, each of the inserts moveable relative to the plug body between an unengaged position, and an engaged position where each of the inserts is wedged between the plug body and the hub and seals across one of the hub bores. The number of inserts is a least one less than a number of hub bores.

In yet another alternate embodiment of the current disclosure, a method for sealing at least one hub bore of a multi-bore fluid hub includes locating a plug assembly within a hub housing of the multi-bore fluid hub. The plug assembly has a plug body with a plug bore extending from a first end of the plug body to a plug bore opening on an outer mating surface of the plug body, an insert in engagement with the outer mating surface of the plug body, and a stem member coupled to the plug body. The plug body is rotated within the multi-bore fluid hub with the stem member so that the plug bore opening aligns with a selected one of the hub bores and the insert aligns with another of the hub bores. The plug body is moved axially relative to the hub housing to move the insert relative to the plug body from an unengaged position, to an engaged position where the insert seals across the other of the hub bores.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE DISCLOSURE

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
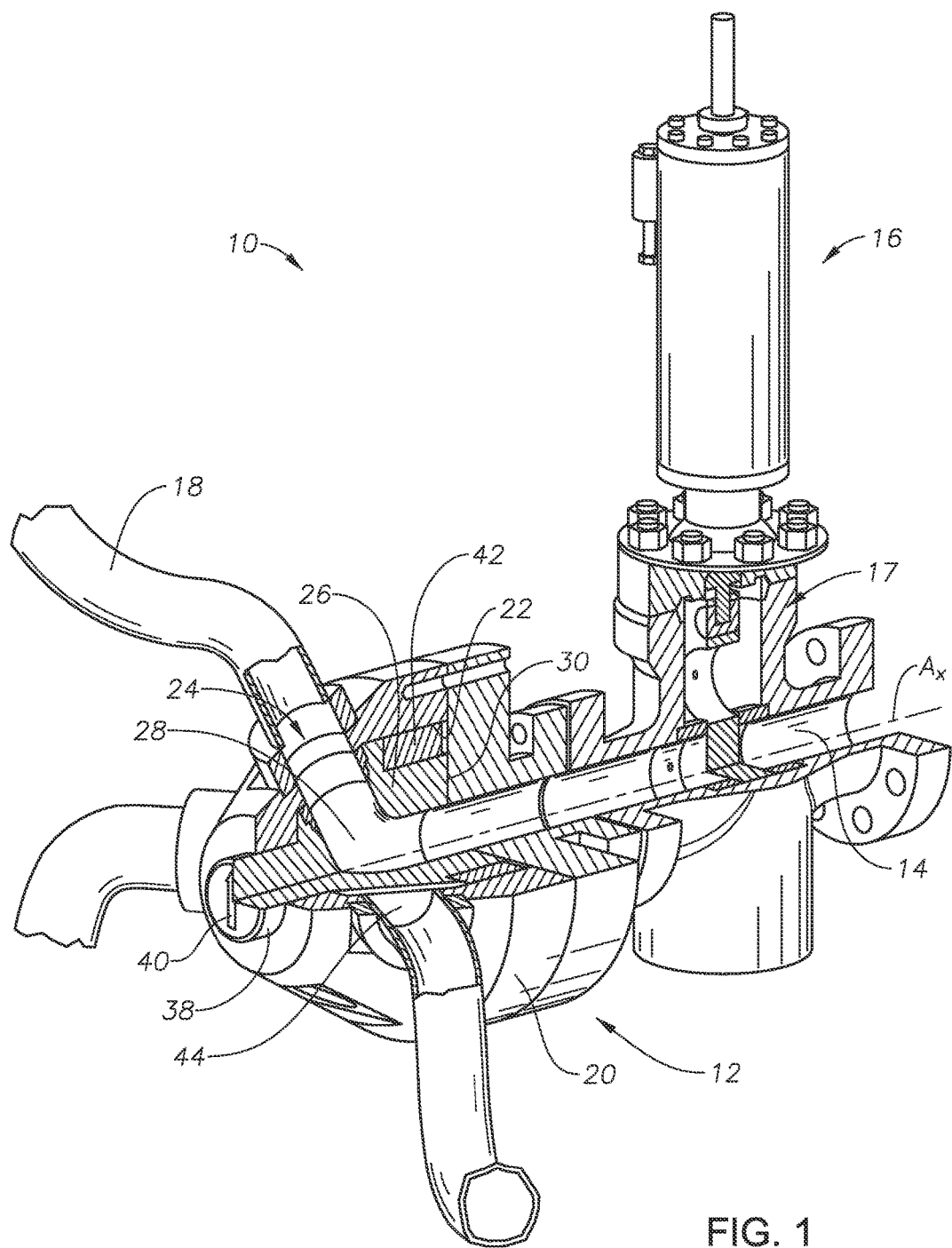
FIG. 1 is a quarter section view of a multi-bore fluid hub with a plug assembly in accordance with an embodiment of this disclosure, shown as part of an example fluid flow system.

Referring to FIG. 1, a fluid flow system 10 is shown with a multi-bore fluid hub 12. Fluid flow system 10 can be associated with a wellhead assembly of a subterranean well for use in hydrocarbon development operations. Fluid flow system 10 can be, for example, part of a hydraulic fracturing system. Fluid flow system 10 has a single fluid supply line 14 for providing fluid to the multi-bore fluid hub 12. Included in the example of FIG. 1, is a valve assembly 16 that can be used to permit or regulate the flow of fluid through fluid supply line 14. Valve assembly 16 is in fluid communication with multi-bore fluid hub 12. Valve assembly 16 can be attached directly to multi-bore fluid hub 12, or there can be intermediate components located between valve assembly 16 and multi-bore fluid hub 12.

Valve assembly 16 is shown having a gate valve 17 in the closed position. In such a position, fluids from fluid supply line 14 would not reach multi-bore fluid hub 12. In alternate embodiments, valve assembly 16 could be another type of valve, such as, for example a ball, choke, or butterfly valve, or could be another flow device. In other alternate embodiments, there is no valve assembly 16, and instead the fluid flow can be controlled directly at the source of the fluid supply (not shown).

Fluid flow system 10 of FIG. 1 also includes a number of fluid outlet lines 18. Each of the fluid outlet lines 18 can direct fluid from fluid supply line 14 to a different location. In the example of FIG. 1, three fluid flow outlet lines 18 are shown. In other embodiments, more or less than three fluid flow outlet lines 18 can be used.

Figure 2:
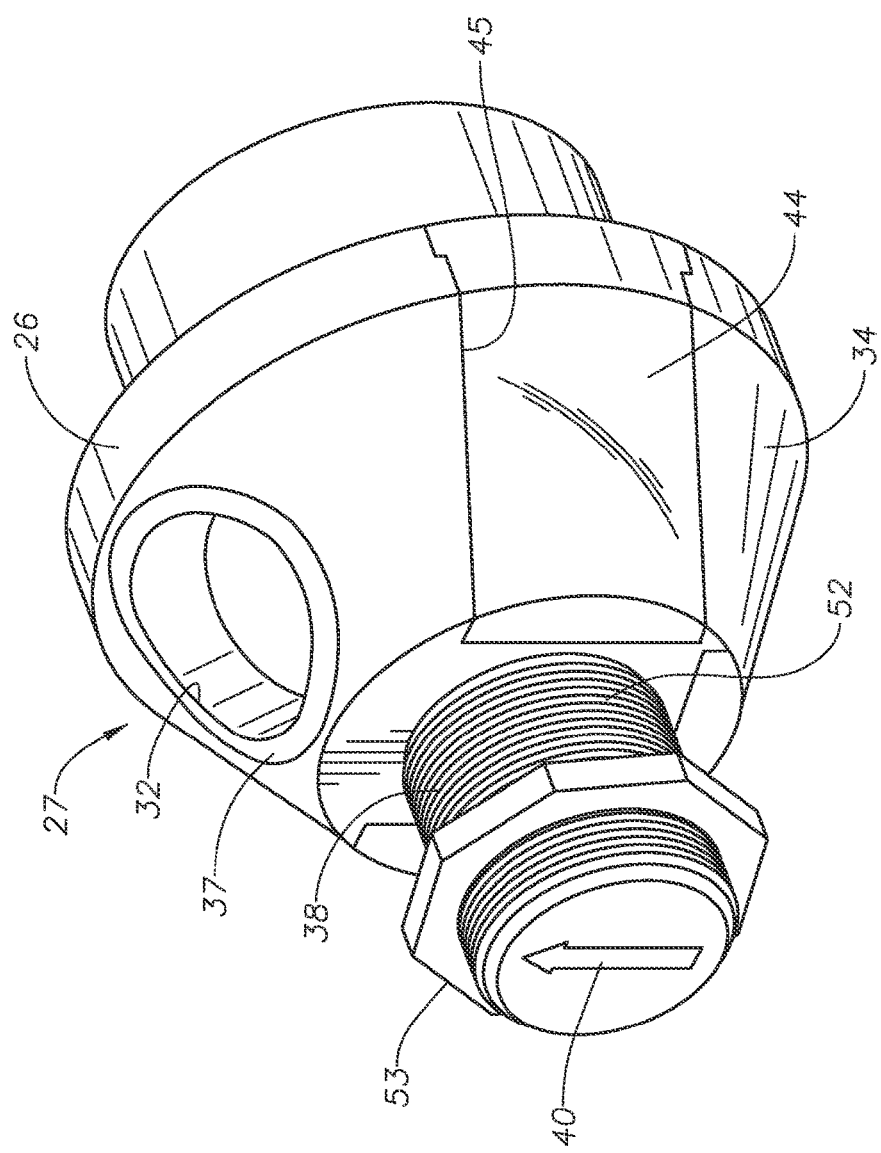
FIG. 2 is a perspective view of the plug assembly of FIG. 1.
Figure 3:
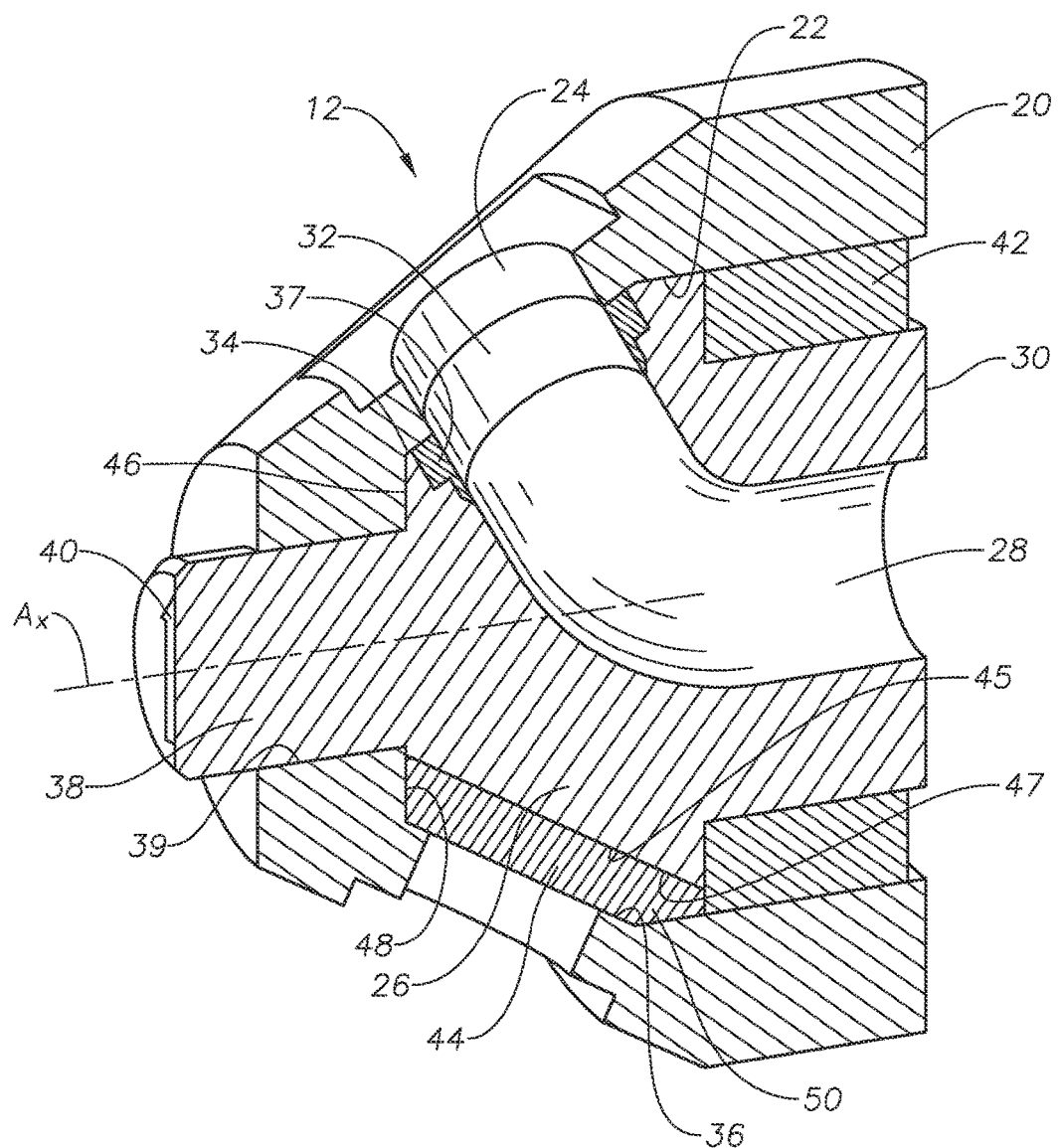
FIG. 3 is a section view of the multi-bore fluid hub and plug assembly of FIG. 1.

Looking now at FIGS. 1-3, multi-bore fluid hub 12 includes hub housing 20. Hub housing 20 has inner cavity 22 and a number of hub bores 24 that extend through a sidewall of hub housing 20 from inner cavity 22 to an exterior of hub housing 20. A fluid flow outlet line 18 can be in fluid communication with each hub bore 24. In the example of FIG. 1, there are four hub bores 24 and a fluid flow outlet line 18 is linked to three of the four hub bores 24. One of the hub bores 24 is in fluid communication with the outer environment.

Continuing to look at FIGS. 1-3, plug body 26 of plug assembly 27 is located within inner cavity 22. Plug body 26 has central axis Ax and plug bore 28 extending from a first end 30 of plug body 26 to plug bore opening 32 on outer mating surface 34 of plug body 26. Outer mating surface 34 in the example embodiments of FIGS. 1-3 is frusto-conical shaped with a larger diameter at the end of outer mating surface 34 that is closer to first end 30 of plug body 26. Outer mating surface 34 is shaped to mate with an opposite facing housing mating surface 36 of hub housing 20. The outer shape of plug body 26 is generally symmetrical about axis Ax so that plug body 26 can rotate within inner cavity 22. In alternate embodiments, outer mating surface 34 need not be frusto-conical, but can be cylindrical instead. Plug bore opening 32 can include annular seal 37. When plug body 26 is in the engaged position, annular seal 37 can circumscribe one of the hub bores 24, forming a seal between plug body 26 and hub housing 20.

Stem member 38 is coupled to plug body 26 at an end opposite to first end 30 of plug body 26. In the example of FIGS. 1-5, stem member 38 is integrally formed with plug body 26. In alternate embodiments, stem member 38 can be separately formed and attached to plug body 26. Stem member 38 extends out of hub housing 20 through opening 39 in an end of hub housing 20. Stem member 38 can be moved to rotate plug body 26 within multi-bore fluid hub 12 so that plug bore opening 32 aligns with one of the hub bores 24. When plug bore opening 32 is aligned with one of the hub bores 24, fluid from fluid supply line 14 can pass through plug bore 28 and into the fluid outlet line 18 that is associated with the hub bore 24 that is aligned with plug bore opening 32. When plug bore opening 32 is fully aligned with one of the hub bores 24, each of the other hub bores 24 is sealed from the fluid flow. Fluid is therefore impeded from communicating with each of the other hub bores 24 unless and until plug body 26 is rotated so that plug bore opening 32 at least partially aligns with one of such other hub bores 24.

Stem member 38 can have a visual indicator 40. Visual indicator 40 can be directed towards plug bore opening 32 so that an operator can quickly identify the directional location of plug bore opening 32.

Plug assembly 27 also includes annular assembly 42 that circumscribes a portion of plug body 26. Annular assembly 42 can be located around a section of plug body 26 with a reduced outer diameter. Annular assembly 42 can provide a dynamic seal between plug body 26 and hub housing 20 to prevent fluids from passing between plug body 26 and hub housing 20 as plug body 26 rotates relative to hub housing 20. Annular assembly 42 can also provide bearings, such as roller bearings or thrust bearings between plug body 26 and hub housing 20.

Figure 4:
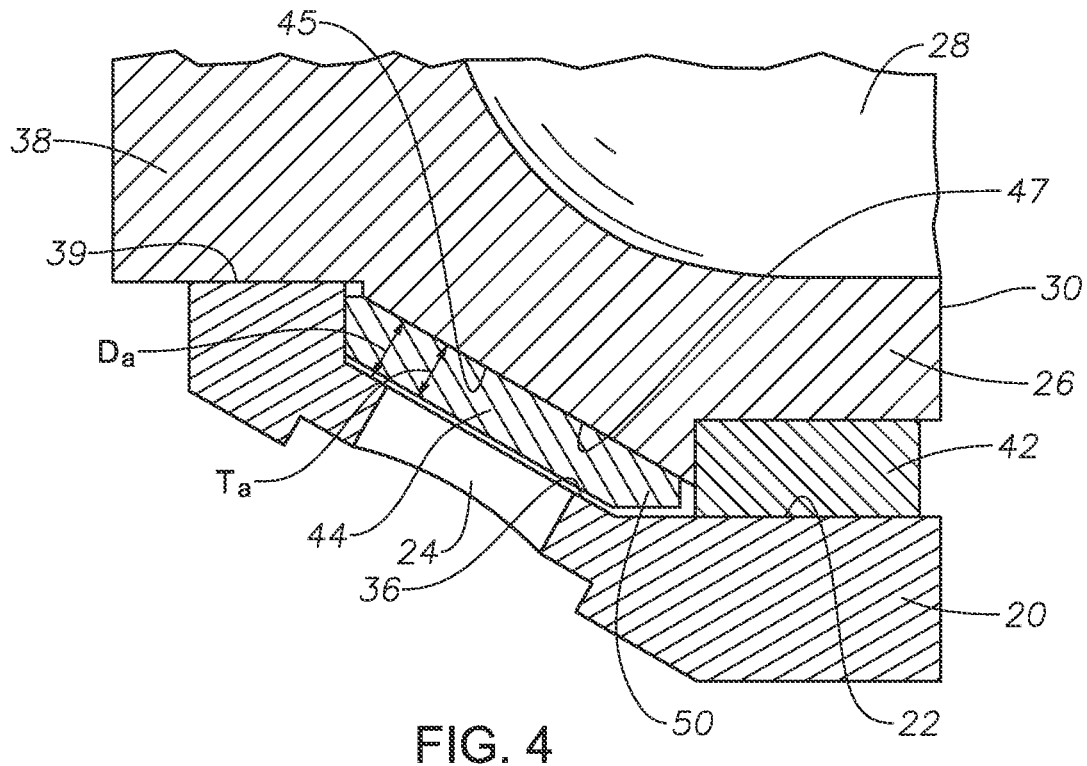
FIG. 4 is a detail section view of a portion of the multi-bore fluid hub and plug assembly of FIG. 1, shown with a plug body in an unengaged position.
Figure 5:
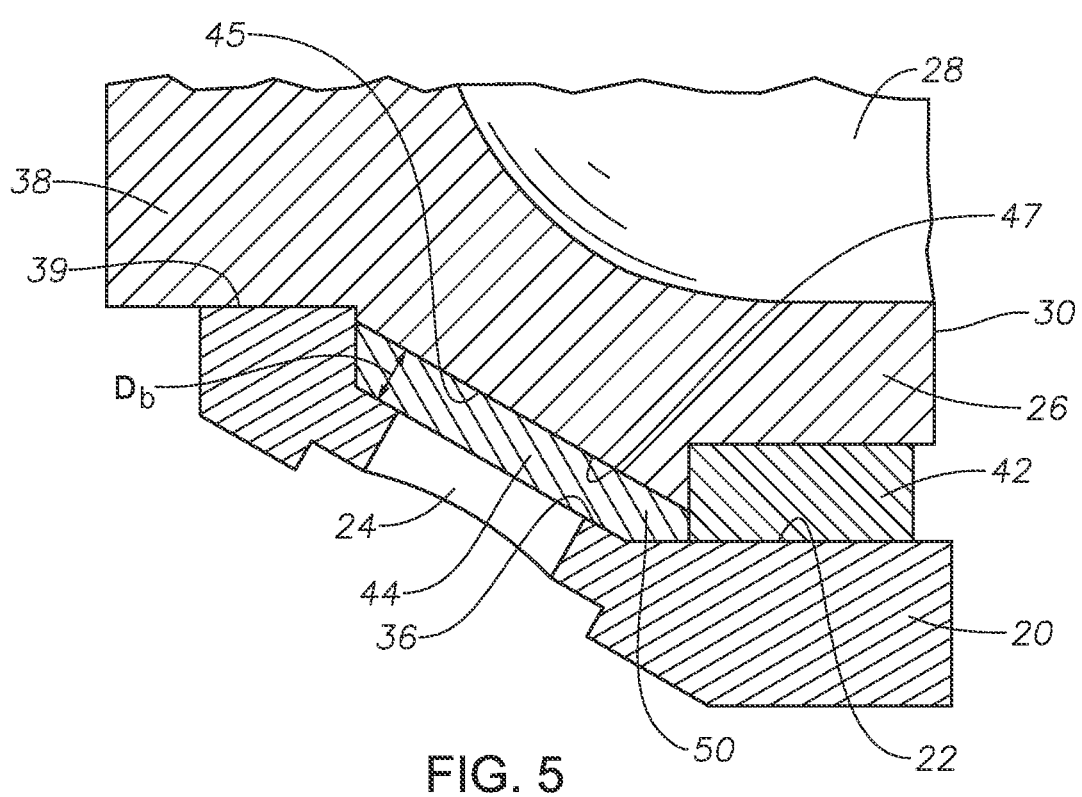
FIG. 5 is a detail section view of a portion of the multi-bore fluid hub and plug assembly of FIG. 1, shown with a plug body in an engaged position.

Looking now at FIGS. 1-5, plug assembly 27 has a number of inserts 44 in engagement with outer mating surface 34 of plug body 26. Inserts 44 are each located within a recess 45 of outer mating surface 34. Recess 45 has a recess surface 47 and two opposite facing side surfaces. The opposite facing side surfaces can have a profile for retaining insert 44 within recess 45. Inserts 44 are spaced around outer mating surface 34 so that each of the inserts 44 can be simultaneously aligned with one of the hub bores 24. Each of the inserts 44 is moveable along recess surface 47 relative to plug body 26 between an unengaged position (FIG. 4), and an engaged position (FIG. 5). When plug body 26 is in the engaged position, each of the inserts 44 is wedged between recess surface 47 of plug body 26 and housing mating surface 36 of hub housing 20 and seals across one of the hub bores 24.

In an example, the number of inserts 44 is equal to at least the number of hub bores 24 minus one, so that when plug bore opening 32 aligns with one of the hub bores 24, one of the inserts 44 will be aligned with one of the other hub bores 24. Each insert 44 has an outer curved surface that is shaped to seal across one of the hub bores 24. Each insert 44 will have a length measured along outer mating surface 34 that is greater than the circumference of hub bores 24 so that insert 44 can seal completely across hub bore 24. In one embodiment, inserts 44 are formed of non-elastomeric material and can be formed of, for example, a polymer, a ceramic a thermoplastic, a composite, and combinations therefore, or other metallic or non-metallic material that will provide a sufficient seal across hub bore 24 to be able to withstand the operation conditions of the fluid flow system 10. In certain embodiments, inserts 44 are formed of a material that allow inserts 44 to function at high pressures, for example at pressures of up to 20,000 psi, and at high temperatures, for example at temperatures of up to 250 degrees Fahrenheit.

Looking at FIG. 4, each of the inserts 44 has a thickness $T_a$ measured normal to recess surface 47 that is less than unengaged distance $D_a$ between recess surface 47 and housing mating surface 36 when plug body 26 is in an unengaged position, also measured normal to recess surface 47. This allows plug body 26 to rotate within inner cavity 22 of hub housing 20 without undue interference by inserts 44. Plug body 26 has plug annular shoulder 46 (FIG. 3) on an outer surface of plug body 26. Plug annular shoulder 46 can mate with a corresponding hub shoulder 48 on inner cavity 22 when plug body 26 is in an engaged position, acting as a hard stop and limiting further axial movement of plug body 26 relative to hub housing 20.

Looking now at FIG. 5, in order to move to the engaged position, plug body 26 is moved axially relative to hub housing 20. When plug body 26 is moved axially in the direction of opening 39, the distance between outer recess surface 47 and housing mating surface 36, becomes engaged distance Db when plug body 26 is in an engaged position, which is smaller than distance Da. This reduction in the distance between recess surface 47 and housing mating surface 36 wedges inserts 44 between recess surface 47 of outer mating surface 34 and housing mating surface 36 of hub housing 20.

Inserts 44 can have wedge shaped portion 50 in cross section. Wedge shaped portion 50 can be engaged by both plug body 26 and hub housing 20 when plug body 26 is in the engaged position. In the engaged position, wedge shaped portion 50 can mate with a corresponding profiled surface of inner cavity 22 to improve the capacity of the seal across hub bore 24. When plug body 26 moves to an engaged position, wedge shaped portion 50 can also encourage inserts 44 to move in a direction generally parallel to outer mating surface 34 so that a radially outward surface of wedge shaped portion 50 meets the corresponding profiled surface of inner cavity 22. In alternate embodiments, inserts 44 can include two separate wedge shaped members that slide relative to each other to form the seal between outer mating surface 34 and hub housing 20.

Looking at the example embodiment of FIGS. 1 and 3, because a portion of plug bore 28 is angled relative to central axis Ax, fluid flowing through plug bore 28 towards plug bore opening 32 will generate an axial force on plug body 26, moving plug body 26 towards the engaged position. The axial forces of fluid flowing through plug bore 28 alone can be sufficient to move and maintain plug bore 28 in an engaged position.

Now looking at the example embodiment of FIG. 2, stem member 38 can further include a stem connector 52. Stem connector 52 can be used to secure to an axial movement device 53 for moving plug body 26 axially towards the engaged position. As an example, stem connector 52 can be a profile, such as threads. The threads could accept a nut that could be screwed onto stem connector 5 of stem member 38. As the nut engages an outer surface of hub housing 20, the nut would draw stem member 38, and therefore also plug body 26 outward, moving plug body 26 axially relative to hub housing 20 and towards the engaged position. Alternately, the threads of stem connector 52 can attach to an actuator or other type of axial movement device 53 that can move plug body 26 axially relative to hub housing 20 and towards the engaged position.

In an example of operation, to seal at least one hub bore 24 of a fluid flow system 10 having a multi-bore fluid hub 12, plug assembly 13 can be located within hub housing 20. Other components of fluid flow system 10 can be made up with multi-bore fluid hub 12, such a valve assembly 16 and fluid flow outlet lines 18. With valve assembly 16 closed, or plug body 26 otherwise located in an unengaged position, plug body 26 can be rotated within multi-bore fluid hub 12 with the stem member 38 so that plug bore opening 32 aligns with a selected one of the hub bores 24 and each of the inserts 44 align with one of the other hub bores 24.

Plug body 26 is then moved axially relative to hub housing 20 to move insert 44 relative to plug body 26 and to move plug body 26 from an unengaged position, to an engaged position where insert 44 seals across one of the other hub bores 24. Plug body 26 can be moved axially relative to hub housing 20 by flowing a fluid into plug bore 28 and towards plug bore opening 32 so that the fluid applies an axial force on plug body 26, moving plug body 26 towards the engaged position. Alternately, plug body 26 can be moved axially relative to hub housing 20 with an axial movement device 53. Plug body 26 can be moved axially until insert 44 is wedged between plug body 26 and hub housing 20 to seal an end of one of the other hub bores 24. In certain embodiments, this will occur when plug annular shoulder 46 mates with hub shoulder 48.

If the operator desires to direct fluid into a different hub bore 24, the flow of the fluid into plug bore 28 will be stopped to relieve the axial force on plug body 26 to allow plug body 26 to return to the unengaged position. In the embodiment where an axial movement device 53 was utilized, the axial movement device 53 can be returned to an unengaged position. Plug body 26 can be rotated within the multi-bore fluid hub 12 with stem member 38 so that plug bore opening 32 aligns with a different one of the hub bores 24. Then plug body 26 can again be moved towards the engaged position either by flowing fluid into plug bore 28 or with an axial movement device 53. These steps can be repeated by an operator in order to deliver a fluid from fluid supply line 14 to any of the fluid flow outlet lines 18.

The terms "vertical", "horizontal", "upward", "downward", "above", and "below" are used herein only for convenience because elements of embodiments of this disclosure may be utilized in various positions.

The system and method described herein, therefore, are well adapted to carry out the objects and attain the ends and advantages mentioned, as well as others inherent therein. While a presently preferred embodiment of the system and method has been given for purposes of disclosure, numerous changes exist in the details of procedures for accomplishing the desired results. These and other similar modifications will readily suggest themselves to those skilled in the art, and are intended to be encompassed within the spirit of the system and method disclosed herein and the scope of the appended claims.

What is claimed is:

1. An apparatus for sealing at least one hub bore of a multi-bore fluid hub associated with a wellhead assembly, the apparatus comprising:

a plug body having a plug bore opening on an outer mating surface of the plug body, and a plug bore extending from a first end of the plug body to the plug bore opening, the plug body having a central axis, being axially movable along the central axis, and selectively insertable into a hub housing of the multi-bore fluid hub;

an insert in engagement with the outer mating surface of the plug body, the insert moveable relative to the plug body between an unengaged position, and an engaged position where the insert seals across one of the hub bores; and a stem member coupled to the plug body, the stem member moveable to selectively rotate the plug body within the multi-bore fluid hub so that the plug bore opening aligns with one of the hub bores and the insert aligns with another of the hub bores.

2. The apparatus of claim 1, wherein the outer mating surface is frusto-conical for selectively mating with an opposite facing frusto-conical surface of the hub housing by axial movement of the plug body relative to the hub housing.

3. The apparatus of claim 1, wherein the insert has an outer curved surface selectively sealable across the hub bore by relative axial movement of the plug body relative to the hub housing.

4. The apparatus of claim 1, wherein the insert has at least one wedge shaped portion in cross section, the wedge shaped portion engaging both the plug body and the hub housing when the plug body is in the engaged position.

5. The apparatus of claim 1, wherein a portion of the plug bore is angled relative to the central axis so that fluid flowing through the plug bore towards the plug bore opening will generate an axial force on the plug body, moving the insert towards the engaged position.

6. The apparatus of claim 1, wherein the stem member further comprises a stem connector, the stem connector selectively secured to an axial movement device for moving the plug body axially towards the engaged position.

7. The apparatus of claim 1, further comprising at least one additional insert, each additional insert selectively alignable with a hub bore.

8. The apparatus of claim 1, further comprising an annular assembly circumscribing a portion of the plug body, the annular assembly selectively providing a dynamic seal and bearing between the plug body and the hub housing.

9. The apparatus of claim 1, wherein the plug body has a plug annular shoulder on an outer surface of the plug body, the plug annular shoulder mating with a corresponding hub shoulder on an inner cavity of the hub housing when the plug body is in an engaged position, limiting axial movement of the plug body relative to the hub housing.

10. An apparatus for sealing hub bores of a multi-bore fluid hub associated with a wellhead assembly, the apparatus comprising:
  a hub housing having a sidewall, the hub bores being formed through the sidewall;
  a plug body having a plug bore extending from a first end of the plug body to a plug bore opening on an outer mating surface of the plug body, the plug body having a central axis, being axially movable along the central axis, and selectively insertable into the hub housing, and which is rotatable in the housing so that the plug bore opening aligns with one of the hub bores;
  a plurality of inserts spaced around the outer mating surface of the plug body, each of the inserts moveable relative to the plug body between an unengaged position, and an engaged position where each of the inserts is wedged between the plug body and the hub and seals across one of the hub bores; and
  a number of inserts is at least one less than a number of hub bores.

11. The apparatus of claim 10, wherein each of the inserts has a length measured along the outer mating surface that is greater than a circumference of the hub bores.

12. The apparatus of claim 10, wherein each of the inserts is formed of a non-elastomeric material.

13. The apparatus of claim 10, wherein when the plug body is in an unengaged position, each of the inserts has a thickness measured normal to the outer mating surface that is less than a distance between the outer mating surface and the hub housing, measured normal to the outer mating surface.

14. The apparatus of claim 10, further comprising a stem member coupled to the plug body, the stem member moveable to selectively rotate the plug body within the multi-bore fluid hub about the central axis.

15. A method for sealing at least one hub bore of a multi-bore fluid hub, the method comprising:
  locating a plug assembly within a hub housing of the multi-bore fluid hub, the plug assembly having: a plug body with a plug bore extending from a first end of the plug body to a plug bore opening on an outer mating surface of the plug body, an insert in engagement with the outer mating surface of the plug body, and a stem member coupled to the plug body;
  rotating the plug body within the multi-bore fluid hub with the stem member so that the plug bore opening aligns with a selected one of the hub bores and the insert aligns with another of the hub bores; and
  moving the plug body axially relative to the hub housing along a central axis of the plug to move the insert relative to the plug body from an unengaged position, to an engaged position where the insert seals across said another of the hub bores.

16. The method according to claim 15, wherein the step of moving the plug body axially relative to the hub housing comprises flowing a fluid into the plug bore and towards the plug bore opening so that the fluid applies an axial force on the plug body, moving the insert towards the engaged position.

17. The method according to claim 16, the method further comprising:
  stopping the flowing of the fluid into the plug bore to relieve the axial force on the plug body to allow the plug body to return to the unengaged position;
  rotating the plug body within the multi-bore fluid hub with the stem member so that the plug bore opening aligns with a different one of the hub bores; and
  restarting the flowing of the fluid into the plug bore to move the plug body towards the engaged position.

18. The method according to claim 15, wherein the stem member has a stem connector, and wherein the step of moving the plug body axially relative to the hub housing comprises securing the stem connector to an axial movement device for moving the plug body axially towards the engaged position.

19. The method according to claim 15, wherein the plug body has a plug annular shoulder on an outer surface of the plug body, and wherein the step of moving the plug body axially relative to the hub housing comprises moving the plug body until the plug annular shoulder mates with a hub shoulder on an inner cavity of the hub housing.

20. The method according to claim 15, wherein the step of moving the plug body axially relative to the hub housing comprises moving the plug body until the insert is wedged between the plug body and the hub housing to seal an end of the selected one of the hub bores.

* * * * *